J. YOUNG.
LICENSE PLATE.
APPLICATION FILED JAN. 10, 1921.
1,381,688.
Patented June 14, 1921.
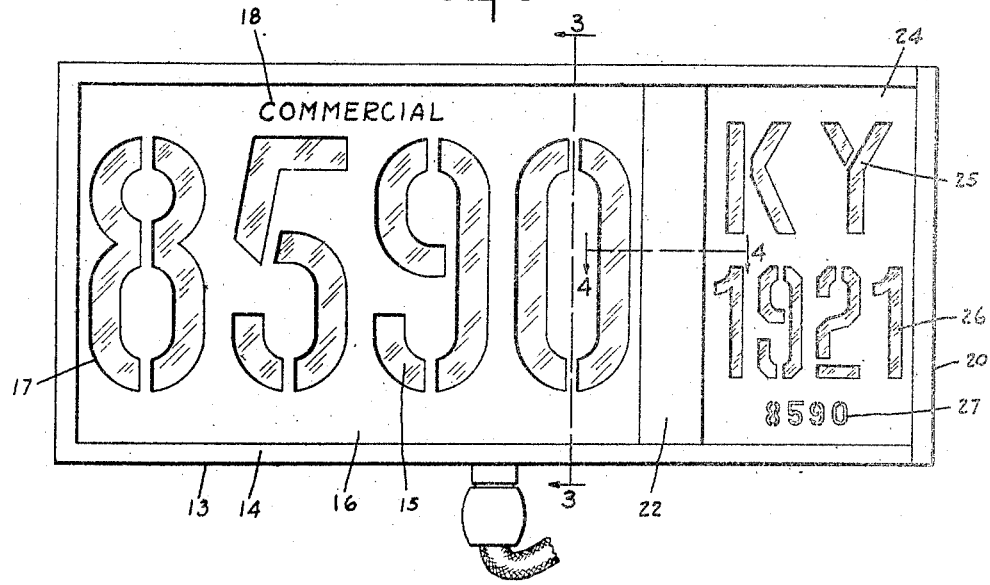
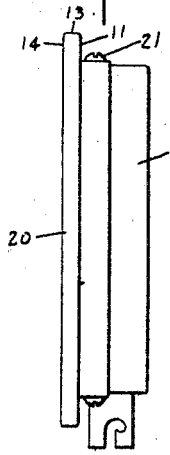
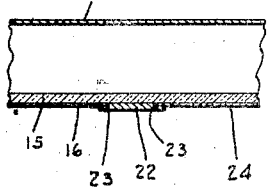
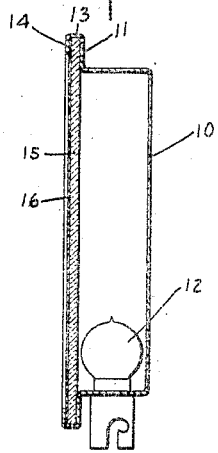
INVENTOR.
JULIUS YOUNG.
BY
ATTORNEYS

UNITED STATES PATENT OFFICE.

JULIUS YOUNG, OF LOUISVILLE, KENTUCKY.

LICENSE-PLATE.

1,381,688.  Specification of Letters Patent.  Patented June 14, 1921.

Application filed January 10, 1921. Serial No. 436,154.

*To all whom it may concern:*

Be it known that I, JULIUS YOUNG, a citizen of the United States, and a resident of Louisville, county of Jefferson, and State of Kentucky, have invented a certain new and useful License-Plate; and I do hereby declare that the following is a full, clear, and exact description thereof, reference being had to the accompanying drawings, in which like numerals refer to like parts.

This invention relates to a combination tail light and license plate.

The chief object of this invention is to provide a license plate with a renewable portion and a permanent portion, said portions being provided with suitable designations and are to be cross-referenced.

Another feature of the invention is that the numerical portion of the license plate is relatively permanent in that the same may be used year after year; while provision is made for annually replacing the year and territorial designations.

The full nature of the invention will be understood from the accompanying drawings and the following description and claim.

In the drawings, Figure 1 is a front elevational view of the license plate embodying the features of the invention. Fig. 2 is an end elevation of the same. Fig. 3 is a sectional view taken on line 3—3 of Fig. 1 and in the direction of the arrows. Fig. 4 is a sectional view taken on line 4—4 of Fig. 1 and in the direction of the arrows.

In the drawings there is illustrated a substantially rectangular casing or housing 10 provided with an outwardly extending flange portion 11, a forwardly extending portion 13 and an inwardly extending portion 14. The inwardly extending portion 14 provides a central opening registering with the other portion of the housing 10. Two parallel portions 11 and 14 provide a groove in which is seatable a suitable transparent or translucent plate 15 which may be of glass or other suitable material and suitably colored, such as red and the like. Positioned forwardly of said plate 15 is a metallic plate 16 which is adapted to protect the glass 15 and also to permit rays of light from within the housing 10 provided by a lamp 12 therein to pass out through said glass. It will be understood that the plate 16 is suitably perforated, preferably in the form of large numerals such as indicated at 17. If desired, the plate may also be perforated with suitable lettering, such as 18, which may read "Commercial dealer," or any other suitable designation. Since the plate 15 may be of red glass and the rays of light adapted to pass through the same and through the numerals and letters 17 and 18, said license plate may also serve as a front and rear warning light.

One end of the plate housing is cut away at the groove forming portion thereof and a suitable end closure member 20 is detachably secured thereto to close the same. Said detachable connection is secured by means of the screw bolts 21. Thus, the plates 15 and 16 are adapted to be slid into and receivable by the groove formed by the portions 11, 13 and 14. A spacing member 22 is also receivable by and slidably supported in said groove, and said slidable spacing member is provided with suitable groove means 23 which engages the end of the plate 16 and holds the same rigid. A smaller plate 24 is also slidably supported by the groove means with the casing or housing and has one end positioned in a groove 23 of the spacing member 22. The opposite end or edge is retained by means of the detachable end closure member 20. Suitable felt means may be associated with the various joints in order to secure the same against rattling and possible breakage. In the present instance the plate 24 is preferably metallic and is perforated with suitable letters 25 designating the territory for which the license is issued, also numerals 26 designating the year for which said license is issued, and also numerals 27 designating the number of the license. The numbers 27 and 17, therefore, must coincide. Since many motor vehicle owners retain their license numbers from year to year and merely renew the same, the foregoing license plate permits the plate 16 to be used year after year and merely requires that the plate 24 be renewed each year.

While the invention has been described as metallic plates which are perforated to disclose the desired information, it will be understood that the glass 16 may be positioned forwardly of the perforated plates, and said plates then may be of paper or other material less durable than the metallic plate.

The invention claimed is:

A rectangular housing having an open face with flange means integral with the edge of said open face rectangular housing and upon three sides of said open face, said flange means being suitably shaped to form a groove, a relatively permanent license indicating means slidably supported in said groove means, and a securing member also supported in said groove means for retaining said relatively permanent license indicating means in said groove, and a relatively renewable license indicating means also slidably seatable in said groove and having one edge bearable upon said securing means, and detachable flange forming means adapted to be rigidly secured to the housing to secure the securing means and both license indicating means in the groove to close said housing.

In witness whereof I have hereunto affixed my signature.

JULIUS YOUNG.